US005161359A

United States Patent [19]

Ziemek et al.

[11] Patent Number: 5,161,359

[45] Date of Patent: Nov. 10, 1992

[54] CABLE STRANDING APPARATUS

[75] Inventors: Gerhard Ziemek, Langenhagen; Wolfram Klebl, Isernhagen; Ernst Hoffmann; Harry Staschewski, both of Langenhagen, all of Fed. Rep. of Germany

[73] Assignee: Kabelmetal Electro GmbH, Hanover, Fed. Rep. of Germany

[21] Appl. No.: 612,504

[22] Filed: Nov. 14, 1990

[30] Foreign Application Priority Data

Dec. 7, 1989 [DE] Fed. Rep. of Germany ....... 3940413

[51] Int. Cl.[5] ........................ D01H 7/92; D02G 1/04; F16D 1/12

[52] U.S. Cl. ........................................ 57/346; 57/293; 57/348

[58] Field of Search ................. 57/293, 310, 314, 330, 57/332, 348, 346; 242/172; 403/26, 3

[56] References Cited

U.S. PATENT DOCUMENTS 2,736,425 2/1956 Fisk .................................... 226/172
3,829,034 8/1974 Mickelson ........................... 403/3 X
4,311,002 1/1982 Hoffmann et al. ..................... 57/293
4,342,190 8/1982 Ziemek et al. ........................ 57/293
4,384,446 5/1983 Hope et al. ...................... 57/293 X
4,525,095 6/1985 Lamb et al. ........................ 403/26 X
4,813,223 5/1989 Nipper et al. ..................... 57/314 X

*Primary Examiner*—Daniel P. Stodola
*Assistant Examiner*—Michael R. Mansen
*Attorney, Agent, or Firm*—James C. Jangarathis

[57] ABSTRACT

A cable stranding apparatus is described as having a plurality of stranding rotor units that are interchangeably coupled, in a locked manner, to a single rotor drive assembly of such apparatus. Each stranding rotor unit is designed to accommodate the dimensions of particular cable elements to be stranded. For this purpose, the stranding rotor unit for cable elements of a large cross-section has a plurality of large collets for accommodating the drawing of such large cable elements through the unit; while the cable stranding rotor unit for cable elements of a small cross-section has a plurality of smaller collets for drawing the smaller cable elements through such unit.

1 Claim, 1 Drawing Sheet

CABLE STRANDING APPARATUS

The invention relates to a cable stranding apparatus including a first stranding rotor unit for stranding a plurality of cable elements of a first cross-sectional size, and upon substitution of an alternate stranding rotor unit, stranding a plurality of cable elements of a second cross-sectional size.

BACKGROUND OF THE INVENTION

Stranding apparatus for continuously stranding cable elements in alternating directions are priorly known. Such apparatus have included clamping collets disposed along a stranding path which encompass the bundles of cable elements and continuously draw them along a longitudinal axis while simultaneously rotating them about such axis to impart a stranding thereof.

Stranding apparatus of this priorly known type enable the continuous stranding of cable elements of large cross-sections. In such apparatus the cable elements are stranded in an elongated path and exit such path directly into a subsequent fabricating station. The manufacturing procedure of the cable is thus substantially simplified.

Priorly known stranding apparatus which continuously rotated and stranded the cable elements in one direction resulted in a cumulative looping of the individual elements and often resulted in undesirable torsional stress characteristics. For example, where the cables were to have branch or connection locations within a predetermined cable length, the one direction stranding presented difficulties in making connections thereto. With the present type of apparatus for providing alternate direction stranding such cumulative looping problem of single direction stranding may be avoided by selecting the number of rotations in each direction of rotation.

OBJECT OF THE INVENTION

An object of the present invention is to provide an improved stranding apparatus for continuously stranding cable elements in alternating directions, such apparatus being of a design that a plurality of stranding rotor units thereof are interchangeable employed for stranding cable elements having small, medium or large cross-sections.

SUMMARY OF THE INVENTION

The object of the present invention is achieved in that a plurality of stranding rotor units of the cable stranding apparatus are each formed as structural units that are interchangeably locked for rotation to a single rotor drive assembly of such apparatus. Thus, in contrast to the prior art stranding apparatus that were fixedly installed on foundations and comprised components primarily of a design to accommodate stranding elements of a limited range of cross-sectional sizes, the present stranding apparatus is adaptable to stranding cable elements of small, medium or large cross-sections. In accordance with the present invention, the appropriate stranding rotor unit is designed to accommodate the dimensions of the cable elements to be stranded. For this purpose, the stranding rotor unit for cable elements of a large cross-section has a plurality of large collets for accommodating the drawing of such large cable elements through such unit, while the stranding rotor unit for cable elements of a small cross-section has a plurality of smaller collets for drawing the smaller cable elements through such unit. A large stranding rotor unit has a slower rotation at substantially lower linear speeds than a smaller stranding rotor unit wherein substantially higher linear speed may be achieved. The inertial forces which are generated when continuous stranding in alternate directions is employed are dependent upon the total inertial moments of the stranding rotor unit and its speed. This dependency results, within the framework of the generated mass inertial moments and speeds, in an almost constant required drive efficiency with cable elements to be stranded. Thus, with the employment of continuous stranding in alternating directions, the instant invention interchangeably employs a plurality of stranding rotor units of different sizes with the same rotor drive assembly, without the loss of drive efficiency.

BRIEF DESCRIPTION OF THE DRAWINGS

A better understanding of the present invention as well as the object and advantages thereof will become apparent upon consideration of the following detailed disclosure thereof, especially when taken with the accompanying drawings wherein.

Figure 1:
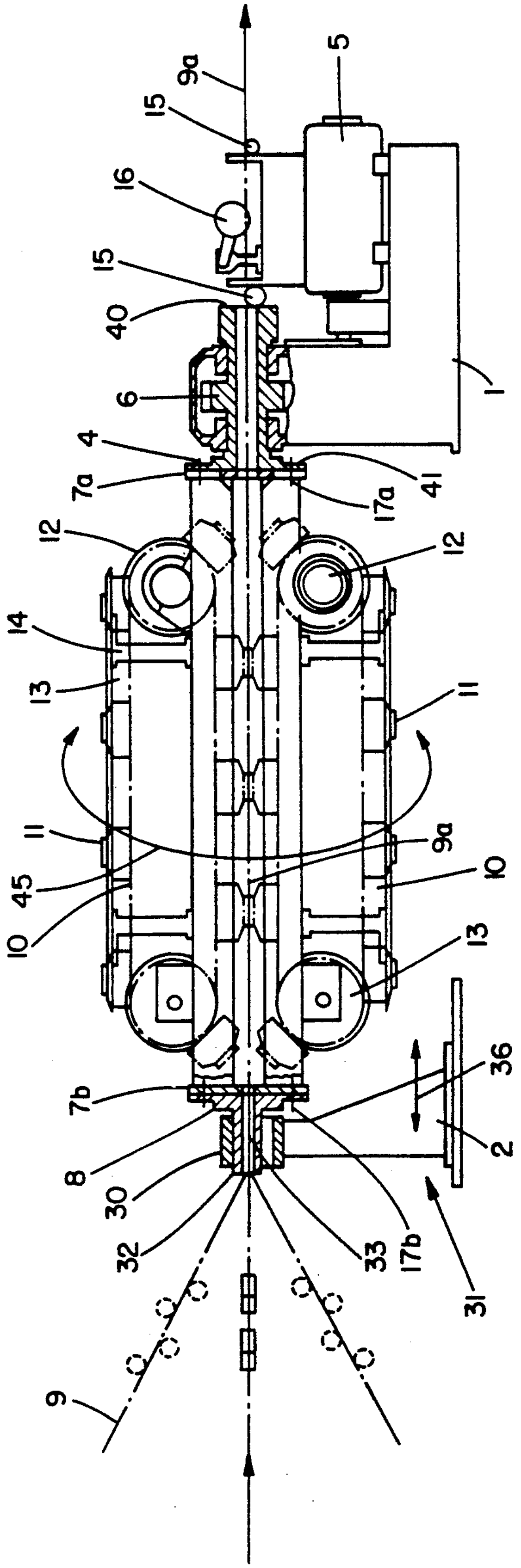
FIG. 1 is a wide view of a cable stranding apparatus including a first stranding rotor unit for stranding cable lines of a particular size.

Referring to the FIG. 1, a cable stranding apparatus is depicted as comprising a rotor drive assembly 1, a rotor support assembly 2, and extending therebetween, a stranding rotor unit 3. The rotor drive assembly 1 includes a rotor drive motor 5, a drive coupling 6 and a rotor drive shaft 4, which cooperate to rotate the rotor drive shaft 4 about a longitudinal axis in alternating rotational directions as indicated by the double-headed arrow 45. The rotor drive shaft 4 includes a cylindrical aperture 40 therethrough for the continuous passage of a stranded cable along the path indicated by the arrow 9*a*, and a flanged section 41 at its cable input end. The rotor support assembly 2 includes a hollow cylindrical support sleeve 30 positioned on a vertical support member 31, so that the longitudinal axis of the sleeve 30 is in alignment with the longitudinal axis of the aperture 40 of the rotor drive shaft 4. Further, the vertical support member 31 is mounted for incremental adjustments in the horizontal direction as indicated by the double headed arrow 36, for moving the rotor support assembly 2 to a fixed position closer or further from the rotor drive assembly 1. Rotatably positioned within the cylindrical support sleeve 30, is a wheel-shaped, receiver member 8 having a cylindrical portion rotatably positioned in the sleeve 30, and a flanged section extending toward one end of the stranding rotor unit 3. Extending through the wheel-shaped, receiver member 8 is an aperture 33 whose longitudinal axis is that of the support sleeve 30, and thus is in alignment with the longitudinal axis of aperture 40 of the rotor drive shaft 4.

The stranding rotor unit 3 which is of a priorly known design, includes a plurality of clamping collets 11 mounted on opposite rotating chains 10. To drive the chains in opposite directions, there are provided chain motor drives 12 and chain wheels 13, which are supported within a rotating frame 14 of the stranding rotor unit 3. At one end of the stranding rotor unit 3 there is provided a face plate 7*a* that is interchangeably affixed to the rotor drive shaft 4 by means of the locking mechanisms 17*a*, while at the other end of the stranding rotor unit 3 there is provided a face plate 7*b* that is interchangeably affixed to the wheel-shaped receiver member 8 by means of locking mechanisms 17*b*. The receiver member 8, the face plate 7*b*, the longitudinal path between each of the pairs of collets 11 while they are in their closed positions, the face plate 7*a* and the hollow drive shaft 4, each in succession provide a segment of a longitudinal cylindrical path through which a plurality of strand elements 9 are continuously longitudinally drawn by the stranding rotor unit 3 through the cable stranding apparatus.

The stranding process performed with the employment of the apparatus of the present invention is as follows:

A plurality of strand elements 9, for example, insulated conductors of an electric cable, are drawn from a plurality of supply reels (not shown) into an input nipple 32 positioned within the longitudinal aperture 33 of the receiving member 8, to form a bundle of such strand elements 9. In this bundled condition, the strand elements 9 are longitudinally moved into the path between the rotating collets 11, and successive pairs of the collets 11 engage the bundle and draw same through the stranding rotor unit 3 until, near the output of such assembly, the successive pairs of collets 11 separate and disengage from the bundle of strand elements. Thus, successive portions of the bundle of strand elements 9 are placed under tension as they pass through the stranding rotor unit 3 and are rotated in alternating directions 45 by the rotation of such stranding unit so as to admit a stranding of the elements 9. Upon exiting the stranding rotor unit 3, the bundle of strand elements 9 is guided through the longitudinal aperture 40 of the roto drive shaft 4, and past a pair of stabilization wheels 15 between which is positioned a measuring wheel 16 for determining the length of the bundle of strand elements 9 moving through the cable stranding apparatus.

Figure 2:
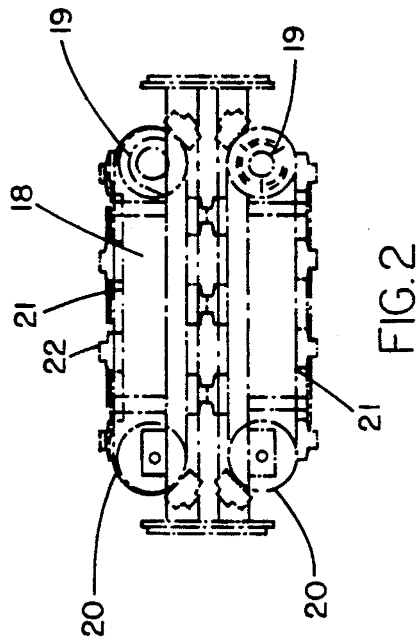
FIG. 2 is a side view of an alternate stranding rotor unit insertable into the cable stranding apparatus of FIG. 1 once the first stranding rotor unit has been removed, for stranding cable lines of a smaller size.

If the cable stranding apparatus in accordance with the present invention is to be used to strand a plurality of strand elements 9 of a smaller size, the stranding rotor unit 3 is readily removed by disengaging the locking mechanisms 17*a* between the face plate 7*a* and the hollow drive shaft 4, and disengaging the locking mechanisms 17*b* between the face plate 7*b* and the receiver member 8, and removing the stranding rotor unit 3. In place of the stranding rotor unit 3, a stranding rotor unit 18 (FIG. 2) of a design similar to that of the unit 3 but of a smaller size, may be readily substituted as a unit. In such procedure, the rotor support assembly 2 is moved so that the distance between the hollow drive shaft 4 and the cable receiver member 8 is reduced to substantially the length of the stranding rotor unit 18, which is then placed therebetween. Thereafter, the locking mechanisms 17*a* and the locking mechanisms 17*b* are employed to affix the stranding rotor unit 18 between the rotor drive shaft 4 and the receiver member 8.

The stranding rotor unit 18 includes motor chain drives 19 and chain wheels 20 for rotating a pair of endless chains 21 on which a plurality of collets 22 are mounted. The structure of stranding rotor unit 18 is substantially similar to that of the stranding rotor unit 3, only the dimensions are smaller to accommodate the smaller cross-sectional dimensions of the smaller strand elements. The stranding procedure as described heretofore as to the employment of the stranding rotor unit 3, is also applicable to the procedure employing th substituted stranded rotor unit 18.

While the invention has been described in connection with an exemplary embodiment thereof, it will be understood that many modifications will be apparent to those of ordinary skill in the art and that this application is intended to cover any adaptations or variation thereof. Therefore, it is manifestly intended that the invention be only limited by the claims and equivalent thereof.

What is claimed:

1. Cable standing apparatus comprising a rotor drive assembly, a rotor support assembly, and extending therebetween, a stranding rotor unit, for stranding a plurality of stranding elements, said rotor drive assembly including a rotor drive shaft and rotor drive means that rotates said rotor drive shaft about a longitudinal axis in alternating rotational directions, said rotor support assembly including a hollow cylindrical support sleeve having a longitudinal axis in alignment with the longitudinal axis of said rotor drive shaft, and a support member upon which said support sleeve is positioned, said support member being mounted for selective adjustments in the horizontal direction for moving said rotor support assembly to a fixed position closer one further from said rotor drive assembly that enables interchangeable mounting of said stranding rotor unit as a whole unit with another such rotor unit of a different size, said rotor support assembly further including a receiver member having a cylindrical portion rotatably positioned within said support sleeve and a connecting portion extending toward and connectable to one end of said stranding rotor unit, said receiver member including a cylindrical aperture whose longitudinal axis is that of said support sleeve, and said stranding rotor unit including a rotatable frame having a plurality of clamping collets mounted on opposite rotatable chains for successively engaging and longitudinally drawing the plurality of strand elements, said rotatable from having a first locking means at one end thereof that is interchangeably affixed to said rotor drive shaft of said rotor drive assembly, and a second locking means at the other end thereof, that is interchangeably affixed to said receiver member of said rotor support assembly.

* * * * *

UNITED STATES PATENT AND TRADEMARK OFFICE

CERTIFICATE OF CORRECTION

PATENT NO. : 5,161,359

DATED : November 10, 1992

INVENTOR(S) : Gerhard Ziemek, et al

It is certified that error appears in the above-indentified patent and that said Letters Patent is hereby corrected as shown below:

Col. 4, line 32, (claim 1) delete "from" and substitute therefor --frame--.

Signed and Sealed this

Twenty-eighth Day of September, 1993

Attest:

Bruce Lehman

BRUCE LEHMAN

*Attesting Officer* *Commissioner of Patents and Trademarks*